United States Patent [19]
Champion et al.

[11] Patent Number: 5,651,286
[45] Date of Patent: Jul. 29, 1997

[54] MICROPROCESSOR BASED APPARATUS AND METHOD FOR SENSING FLUID LEVEL

[75] Inventors: James R. Champion, Sarasota; Robert D. Shaw, Bradenton, both of Fla.

[73] Assignee: Teleflex Incorporated, Plymouth Meeting, Pa.

[21] Appl. No.: 685,251

[22] Filed: Jul. 23, 1996

[51] Int. Cl.$^6$ .................................................. G01F 23/00
[52] U.S. Cl. .......................... 73/290 V; 324/644; 324/642
[58] Field of Search ............................. 73/290 R, 290 V; 324/642, 644, 648

[56] References Cited

U.S. PATENT DOCUMENTS

| | | |
|---|---|---|
| 3,812,422 | 5/1974 | De Carolis . |
| 3,832,900 | 9/1974 | Ross . |
| 3,995,212 | 11/1976 | Ross . |
| 5,457,394 | 10/1995 | McEwan . |
| 5,457,990 | 10/1995 | Oswald et al. . |

Primary Examiner—Richard Chilcot
Assistant Examiner—Ronald Biegel
Attorney, Agent, or Firm—Howard & Howard

[57] ABSTRACT

A method and apparatus (10) for sensing a surface level (24) of fluid (12) in a tank (14) having an electrically conducting pickup tube (20) extending through a wall (16) of the tank (14) and into the fluid (12) includes a time domain reflectometry circuit (40) connected to the tube (20) for generating an incident pulse (68) that travels down the tube (20) and a portion of which is reflected at the surface (24) as a reflected pulse (70,72) which travels back along the tube (20) and is sensed by the circuit (40). The circuit (40) includes a microprocessor (92) which utilizes the elapsed time between the generation of the incident pulse (68) and the receipt of the reflected pulse to determine the position of the surface (24) relative to a reference point and the amount of the fluid (12) in the tank (14) and indicate the amount of fluid at a display (106). The tube (20) forms a transmission line with one of a plate (48), an outer tube (110) and a return tube (130). A sensor (98) connected to the microprocessor (92) generates information representing parameters of the fluid (12) and the microprocessor (92) communicates over a bus line (94).

26 Claims, 5 Drawing Sheets

MICROPROCESSOR BASED APPARATUS AND METHOD FOR SENSING FLUID LEVEL

BACKGROUND OF THE INVENTION

The present invention relates to an apparatus and method for sensing fluid levels in a closed tank.

Various mechanical, electromechanical and sonic techniques have been employed to measure the level of liquid in a container or the interface levels between two or more liquids. The mechanical and electromechanical systems are relatively slow in reacting to changes in the level of the liquid, while systems employing sonic or ultrasonic transmissions become complex when used to measure the surface levels of contained liquids because of the echoes received from the surfaces forming the sides of the container.

Most prior art radiation reflection detection systems, while providing highly accurate indications of liquid level and responding in extremely short times to changes in the levels of the contained liquids, require very complex and expensive apparatus in order to function properly. One prior art system which attempts to minimize this complexity is shown in the U.S. Pat. No. 3,832,900. This system utilizes an open coaxial line which is immersed in the contained liquid, the contained liquid thereby filling the coaxial line. The liquid surface creates a discontinuity in the coaxial line which produces a reflection of the base band pulse signal that propagates back along the transmission line. The time at which this reflection is received, relative to the time of the transmitted pulse, determines the level of the liquid. However, the transmission line tends to clog and requires frequent cleaning.

Another apparatus for measuring the level and dielectric constant of liquid is shown in the U.S. Pat. No. 3,995,212. This device generates a subnanosecond base band pulse that propagates through a transition device to a single wire transmission line that extends through an air filled region into the liquid. The discontinuity created at the air-liquid interface produces a reflection of the base band pulse that is compared with the transmitted pulse with respect to time of arrival and amplitude to determine the liquid level and the reflection coefficient at the air liquid interface. The reflection coefficient is then utilized to determine the dielectric constant of the liquid.

Another fluid level sensor is shown in the U.S. Pat. No. 5,457,990 wherein a fuel level sensor includes a coaxial conductor probe that is positioned within a fuel tank at an angle relative to vertical and horizontal references. A repetitive electrical signal having a train of transients is transmitted from the upper end of the line and the line is monitored for reflections exceeding a threshold to generate an analysis window during which time the received reflected signals are analyzed to determine the level of the liquid in the tank.

The U.S. Pat. No. 3,812,422 discloses another time domain reflectometry fuel measuring device. This fuel measuring device requires a coaxial arrangement that has a grounding device between the inner and outer conductors. The grounding device is preferably in the form of a metallic plug at the bottom of the probe between the two conductors without which accurate measurements cannot be acquired.

A micropower impulse radar studfinder device utilizing time domain reflectometry is shown in the U.S. Pat. No. 5,457,394. Unmodulated pulses, approximately 200 ps wide, are emitted from a generator positioned on the surface of a wall. A large number of reflected pulses are sampled and averaged while background reflections are subtracted. Reflections from wall studs or other hidden objects are detected and displayed using light emitting diodes.

SUMMARY OF THE INVENTION

In summary, the present invention concerns an apparatus for sensing a level of a fluid in a tank. The apparatus includes a pulse means for generating a plurality of incident pulses and for sensing a plurality of reflected pulses, the pulse means including a first pulse generator means having an output connected to an input/output signal means for generating the incident pulses, a microprocessor means having a first output connected to an input of the first pulse generator means for turning on and off the first pulse generator means, a gate means having a first input connected to the input/output signal means and a second input connected to a second output of the microprocessor means and an output connected to a first input of the microprocessor means, and wherein the microprocessor means generates a pulse train at the second output for gating the gate means to pass the reflected pulses to the first input of the microprocessor means and has a third output for generating a sensing signal. The apparatus also includes an electrically conductive pickup tube means having a lower end and being connected to the input/output signal means at a point adjacent an upper end spaced a predetermined distance from the lower end, the pickup tube means being adapted for insertion into a tank with the lower end in a first fluid for drawing the first fluid from the tank through the pickup tube means whereby when the pickup tube means is inserted into the tank with the lower end in the first fluid and the pulse means generates the incident pulses, each incident pulse travels from the point along the pickup tube means to a surface of the first fluid at a boundary of a second fluid above the first fluid to generate an associated one of the reflected pulses which travels back along the pickup tube means to the point, and the microprocessor means is responsive to the generation of the incident pulses and receipt of the associated reflected pulses for determining an elapsed time between the generation and the receipt for generating the sensing signal at the third output in response to the elapsed time, the sensing signal representing an amount of the first fluid in the tank.

The third output of the microprocessor means is connected to an input of a display driver means for generating a display signal at an output of the display driver means and a display means is connected to the output of the display driver means and is responsive to the display signal for indicating the amount of the first fluid in the tank. The amount indicated by the display means can be a low fluid warning.

The microprocessor means has another input and the apparatus includes a sensor means connected to the another input for generating a sensor signal representing a parameter of the first fluid to the microprocessor means. The sensor means can be a temperature sensor for sensing a temperature of the first fluid and the parameter is a temperature value of the first fluid. The sensor means can be a pressure sensor for sensing a pressure of the first fluid and the parameter is a pressure value of the first fluid in the tank or the pressure value of the first fluid in the pickup tube means. The sensor means can be a flow sensor for sensing a flow rate of the first fluid and the parameter is a flow rate of the first fluid in the pickup tube means. The apparatus can include a return tube means adapted for insertion into the tank adjacent the pickup tube means for returning to the tank at least a portion of the first fluid drawn from the tank and wherein the sensor means includes another flow sensor for generating another sensor signal representing another parameter of the first fluid to the microprocessor means, the another flow sensor sensing a flow ram of the first fluid and the another parameter is a flow rate of the first fluid in the return tube means. The microprocessor means is responsive to the sensor signal generated by the flow sensor and the another sensor signal generated by the another flow sensor for generating the display signal representing a rate of usage of the first fluid.

The microprocessor means has an input/output connected to a bus means for generating and receiving information signals on the bus means and the information signals can include the sensing signal and the sensor signal. Also included is a tank volume means, option switches or memory, connected to the microprocessor means for generating values of tank volume versus fluid level, the microprocessor means generating the sensing signal in response to the values and the elapsed time.

The present invention also concerns a method of sensing a level of a fluid in a tank comprising the steps of: a. generating an incident pulse at a predetermined point on an electrically conducting pickup tube extending into a tank with a lower end of the pickup tube positioned at a lowest fluid level to be sensed, the incident pulse travelling toward the pickup tube lower end and generating a reflected pulse at a surface level of the fluid, the reflected pulse travelling from the surface level to the predetermined point; b. sensing the reflected pulse at the predetermined point; c. utilizing a microprocessor means to determine an elapsed time between generation of the incident pulse and receipt of the reflected pulse at the predetermined point; and d. utilizing the microprocessor means to determine an amount of the fluid in the tank based upon the elapsed time.

The method includes a step of utilizing the microprocessor means to determine a length of the pickup tube between the predetermined point and the pickup tube lower end based upon an elapsed time between generation of the incident pulse and receipt of another reflected pulse at the predetermined point, the another reflected pulse being generated at the lower end of the pickup tube. The step a. can include generating a train of the incident pulses at a first predetermined frequency and the step b. can include sensing for associated ones of the reflected pulses at a sample rate equal to the first predetermined frequency modulated by a second predetermined frequency less than the first predetermined frequency.

The step d. can include determining the level of the fluid in the tank based upon the elapsed time and determining the amount of the fluid in the tank by selecting the amount based upon the level from a table of tank volume versus level values. The step d. also can include generating a sensing signal representing the amount of the fluid in the tank and further wherein the sensing signal represents a low amount of the fluid in the tank.

It is an object of the present invention to reduce the cost and complexity of systems for measuring the level of a fluid in a tank.

The present invention has the advantage of not requiring a separate probe by transmitting the incident pulse and receiving the reflected pulse on the pickup tube of a fluid tank.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The present invention concerns the use of time domain reflectometry (TDR) to measure fluid levels in a closed tank. Time domain reflectometry measures the pulse-echo interval of a short electrical pulse propagating from a pulse source along a conductor to a break and back to the pulse source where a pulse receiver is located. The measured interval "T" between generation and reception is scaled by the speed of light "C" and the square root of the relative dielectrical constant "$\epsilon_r$," of the material surrounding the conductor to determine the distance "D" to the break, or $D=(\epsilon_r)^{.5}CT$. The conductor can be an electrical transmission line that is inserted into fluids and the gas/liquid or liquid/liquid boundary becomes the "break" or discontinuity that reflects the pulse. The time difference between a pulse generated and a reflection received at the start of the line from the boundary can be used to determine the distance along the line and consequently the fluid level which creates the boundary. When the line is inserted into a liquid, the strength of the reflected pulses scale with the dielectric constants at the gas/liquid boundary in subsurface liquid/liquid boundaries. When the liquid has a low relative dielectric constant, such as JP-3 jet fuel ($\epsilon_r=2.08$), only a portion of the pulse is reflected at the gas/liquid boundary and the remaining portion continues into the liquid until another discontinuity is reached, such as an oil/water boundary ($\epsilon_r=79$ for water), or the tank bottom itself ($\epsilon_r=\infty$ for metal). Thus, the line can measure fuel fill level while providing additional information about conditions within the tank.

The pulses traveling down the line are reflected at the precise gas/liquid or liquid/liquid boundary regardless of the dielectric constants involved. The dielectric constants affect the amplitude of the reflected pulses, but not their position and time. Pulse amplitude variations may introduce measurement errors, but these errors can be trimmed out in the associated electronics since the dielectric constant of the liquid in a tank is generally known.

Figure 1:
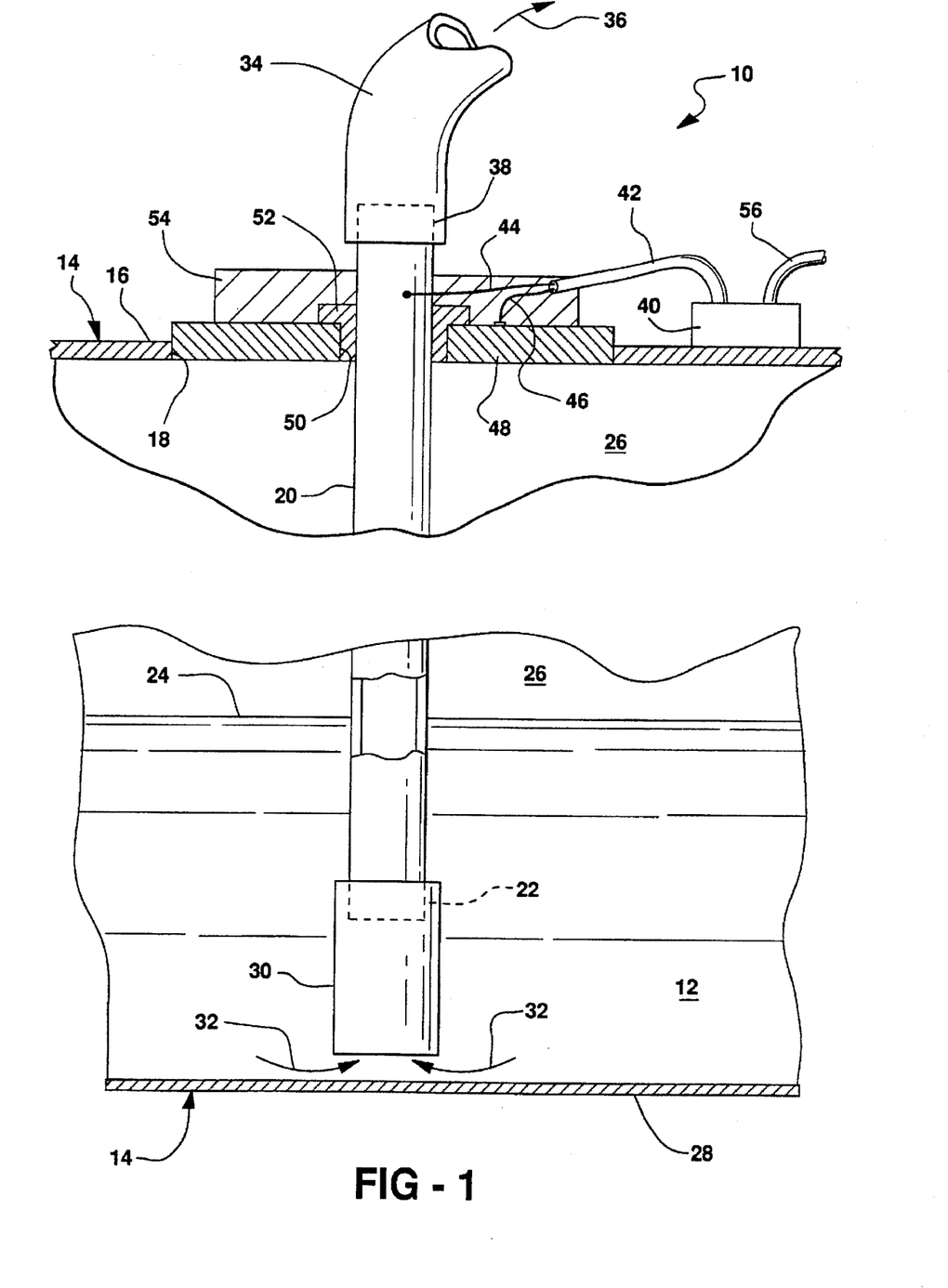
FIG. 1 is a fragmentary cross sectional view of a liquid storage tank including a fluid level sensing apparatus in accordance with the present invention.

There is shown in the FIG. 1 a fluid level sensing assembly 10 in accordance with the present invention for measuring a level of liquid 12 inside a tank 14. The tank 14 includes an upper wall 16 having an aperture 18 formed therein through which a liquid pickup tube 20 extends. A lower end 22 of the tube 20 extends below a surface level 24 of the liquid 12 which level defines a boundary between the liquid and a gas 26, such as air, filling an upper portion of the tank 14. The lower end 22 terminates above a lower wall 28 of the tank 14. A reserve end 30, in the form of a piece of plastic tubing, is attached to the lower end 22 of the tube 20 to form an inlet for receiving the liquid 12 in the direction of an arrow 32. Although shown as a generally straight tube, the reserve end 30 can be any desired shape such as a generally L-shape with a leg extending generally parallel to the lower wall 28. The liquid 12 is drawn through the plastic tubing 30 and through the tube 20 and exits the tank 14 through a pickup line 34 as shown by an arrow 36. The line is connected between an upper end 38 of the tube 20 and a suction device (not shown) such as a pump for drawing the liquid from the tank 14. Although the present invention has many applications, the tank 14 can be, for example, a fuel tank of a vehicle and the liquid 12 can be a fuel such as gasoline.

The fluid level sensing assembly 10 includes a time domain reflectometry (TDR) circuit 40 mounted on an outer surface of the upper wall 16. A length of coaxial cable 42 has one end connected to an input/output of the circuit 40 and an opposite end which terminates adjacent the upper end 38 of the pickup tube 20. The tube 20 is formed of an electrically conductive material, or has an electrically conductive coating on an exterior surface thereof. A center conductor 44 of the coaxial cable 42 is electrically attached to the exterior surface of the pickup tube 20. A shield 46 of the coaxial cable 42 is electrically connected to a combination reflector base plate and mounting plate 48 which is mounted in the aperture 18 formed in the upper wall 16 of the tank 14. The plate 48 has an aperture 50 formed therein through which the tube 20 extends without contacting the plate. The space between the outside surface of the tube 20 and the wall of the aperture 50 is closed by a flanged seal 52 mounted on an upper surface of the plate 48. A cover 54 encloses the seal 52 and the end of the coaxial cable 42 adjacent the tube 20. A sensing signal cable 56 has one end connected to the TDR circuit 40 and an opposite end connected to a liquid level gauge (shown in FIG. 2). Although shown spaced from the tube 20, the TDR circuit 40 could be mounted under the cover 54 and the cable 42 could then be eliminated. Also, if the upper wall 16 of the tank 14 is formed of a suitable metal material, the plate 48 can be eliminated and the aperture 18 reduced to the size of the aperture 50.

Figure 2:
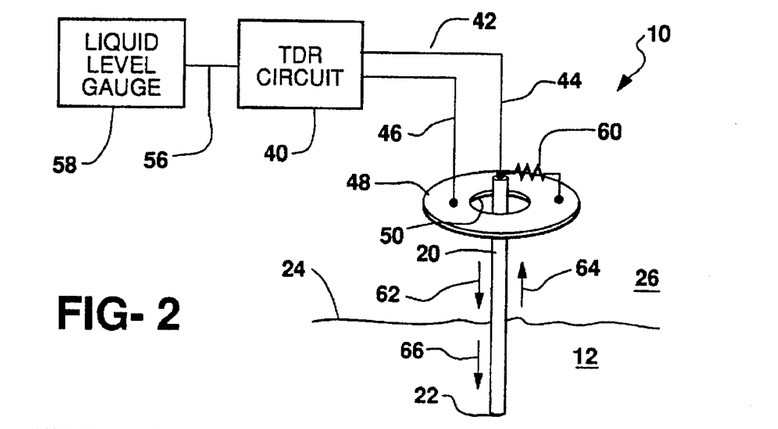
FIG. 2 is schematic diagram of the fluid level sensing apparatus shown in the FIG. 1.

There is shown in the FIG. 2 a schematic diagram of the fluid level sensing assembly 10. A liquid level gauge 58 is connected to an output of the TDR circuit 40 by the sensing signal cable 56. The central conductor 44 of the coaxial cable 42 is connected between the TDR circuit 40 and the pickup tube 20. The end of the central conductor 44 also can be connected through an impedance mismatch 60 to the plate 48. The shield 46 of the coaxial cable 44 is connected to the plate 48 to complete the electrical circuit. The lower end 22 of the pickup tube 20 extends through the air 26 and below the surface level 24 of the liquid 12.

In operation, the TDR circuit 40 generates an ultra-short pulse along the central conductor 44. This pulse must be applied to a probe which is some form of transmission line having a characteristic impedance and is inserted in two fluids which have different dielectric impedances such that a boundary is formed which reflects the pulse. The pickup tube 20 and the plate 48 form a type of Gaobau transmission line, or "G-line". The pulse travels down the exterior surface of the tube 20 in the direction of an arrow 62 which pulse is known as the incident pulse having a voltage magnitude $V_i$. At the surface level 24 of the liquid 12, the incident pulse encounters a boundary between air 26 above and liquid 12 below the level 24. This boundary causes a portion of the incident pulse to be reflected back up the tube 20 in the direction of an arrow 64 as a reflected pulse having a voltage magnitude $V_r$. The remaining portion of the incident pulse travels through the liquid 12 toward the lower end 22 of the tube 20 in the direction of an arrow 66 as a forward scattered pulse having a voltage magnitude $V_f$.

Figure 3A:
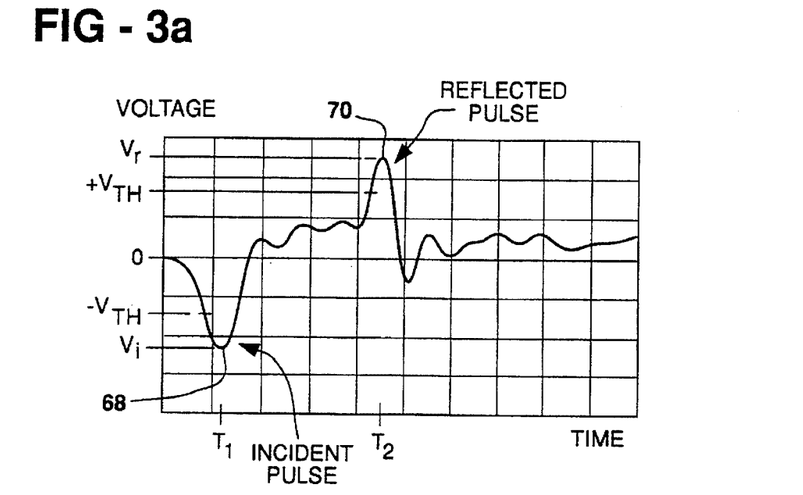
FIGS. 3a and 3b are waveform diagrams of the level sensing signals generated by the fluid level sensing apparatus shown in the FIG. 2.
Figure 3B:
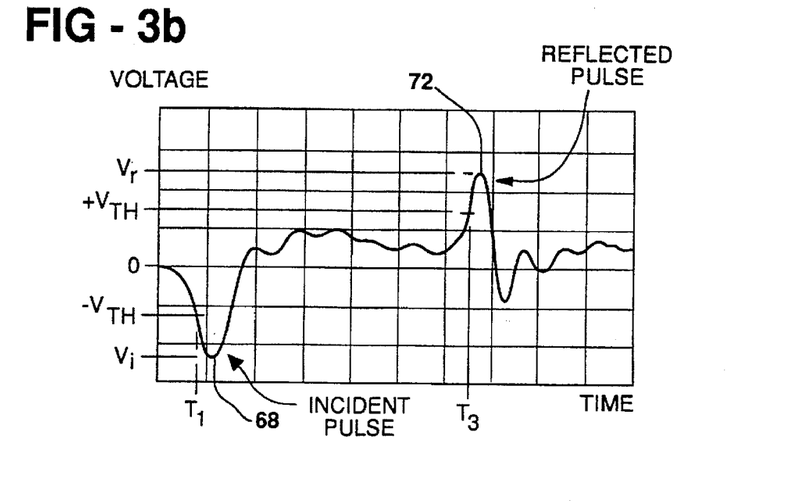

There is shown in the FIG. 3a a signal magnitude voltage versus time waveform diagram of the incident pulse and reflected pulse signals generated from and back to the TDR circuit 40. An incident pulse 68 is generated with the incident pulse voltage magnitude $V_i$ at the plate 48 at an incident pulse generation time $T_1$. The incident pulse 68 travels down the tube 20, but the plate 48 also generates a reflection as a fiducial pulse to the TDR circuit 40. Thus, the fiducial pulse generated at the time $T_1$ can be used by the TDR circuit 40 as a reference to determine the elapsed time to receipt of a reflected pulse. If the liquid surface 24 is relatively high in the tank 14, a first reflected pulse 70 arrives at the plate 48 at a time $T_2$. The difference between the generation time $T_1$ and the arrival time $T_2$ permits the calculation of the distance from the base plate 48 to the surface level 24. Use of this time difference eliminates timing errors and drift in the coaxial cable 42 and the TDR circuit 40. There is shown in the FIG. 3b a second reflected pulse 72 at a time $T_3$ representing an arrival time for a reflected pulse from a relatively low liquid level such that the difference between the time $T_1$ and the time $T_3$ can be used to calculate the distance from the base plate 48 to the surface level 24. The base plate 48 must have no lateral dimension smaller than the width of the incident pulse times the speed of light "C" divided by two.

Figure 4:
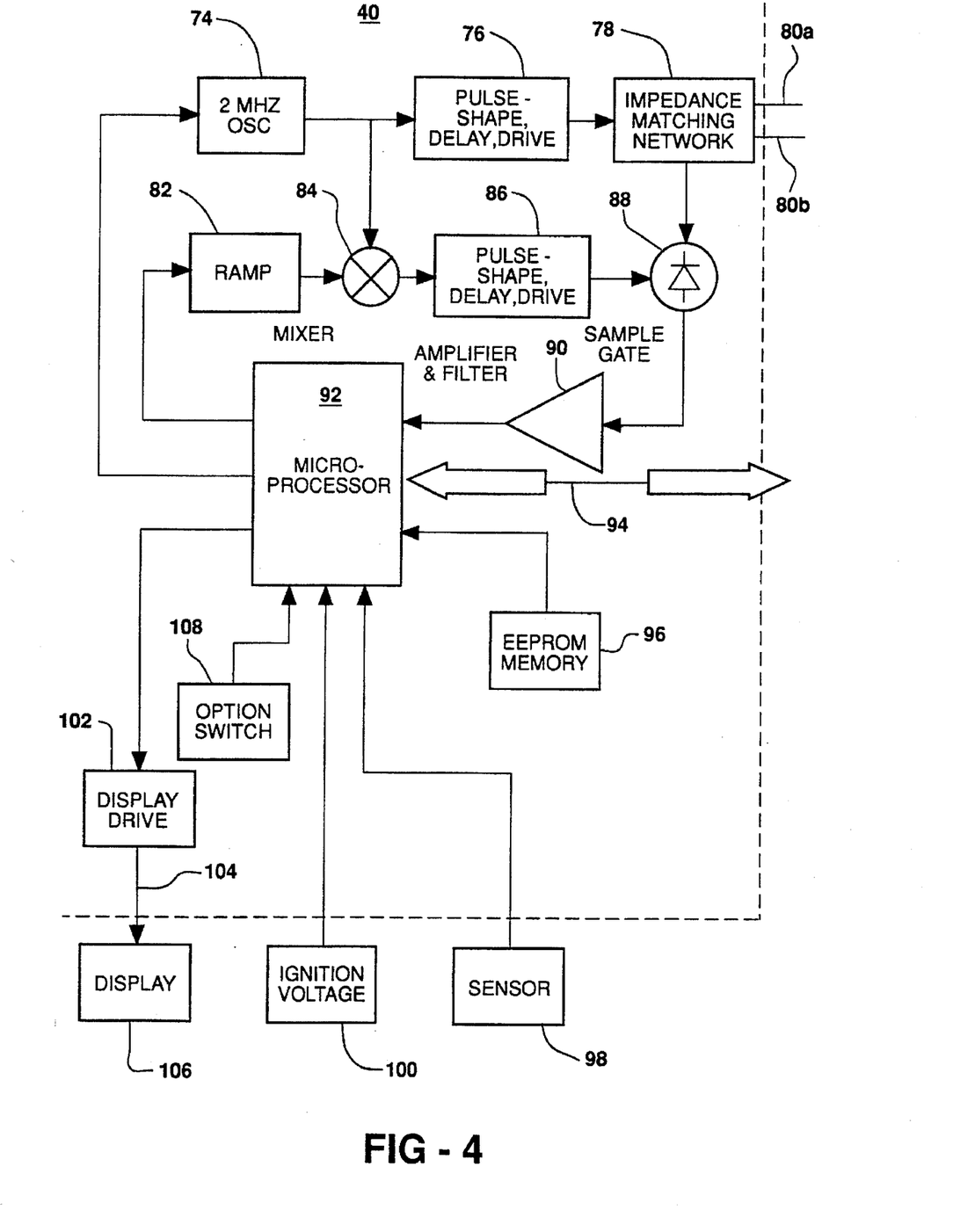
FIG. 4 is a schematic block diagram of the time domain reflectometry circuit shown in the FIG. 2.

There is shown in the FIG. 4 a schematic block diagram of the TDR circuit 40. In response to a signal at an input, a first oscillator 74 generates a pulse train at an approximately two MHz rate at an output connected to an input of a first pulse generator 76. Although a two Mhz oscillator is described, any frequency in a wide range of lower and higher frequencies can be used and may be based upon any one of a number of commercially available oscillator circuits. The pulse generator 76 has an output connected to a first input of an impedance matching network 78. The pulse generator 76 shapes and delays the input pulses and generates ultra-short drive pulses as the incident pulses 68 on a pulse conductor 80a which is connected to an output of the impedance matching network 78 which functions as an input/output for the TDR circuit 40. Also connected to the impedance matching network 78 is a ground conductor 80b which connects the ground of the circuit 40 with the ground for the rest of the assembly 10. The conductor 80a is connected to the central conductor 44 of the cable 42 and the conductor 80b is connected to the shield 46. In the case where the cable 42 can be eliminated by locating the TDR circuit 40 adjacent the tube 20, the network 78 includes a directional sampler which separates a reflected pulse from an incidence pulse that has not terminated before the reflected pulse is received. The first oscillator 74 and the first pulse generator 76 comprise a pulse means for generating the incident pulses the width of which will depend upon the length of the tube 20 between the lower end 22 and the plate 48 and the desired percentage of length resolution. For example, a 200 ps wide pulse generated at the two Mhz pulse rate provides a resolution of approximately 0.0005".

The remainder of the TDR circuit 40 comprises a sensing means for determining and generating an indication of the liquid level 24. A pulse train at a forty Hz rate is generated by a second oscillator at an input of a ramp generator 82. Although forty Hz is described, any frequency in a wide range of lower and higher frequencies can be used and may be based upon any one of a number of commercially available oscillator circuits. The ramp generator 82 generates a ramp signal at the repetition rate of the input pulse train at an output connected to an input of a mixing or summing circuit 84 which has another input connected to the output of the first oscillator 74 for generating a signal at an output. The output of the mixing circuit 84 is connected to an input of a second pulse generator 86 which has an output connected to a gate input of a sample gate 88. The sample gate 88 has an input connected to the pulse conductor 80a through the network 78 and an output connected to an input of an amplifier and filter circuit 90. The sample gate 88 is gated on and off by gate pulses generated by the second pulse generator 86 with a variable or semi-random delay to switch from hold to sample and back to hold. The timing of the gate pulses is a two MHz signal that has been phase modulated such that the reflected signal is sampled for at times representing possible reflections over the full length of the tube 20.

An output of the amplifier and filter circuit 90 is connected to a first input of a microprocessor 92. The voltage appearing at this output of the circuit 90 is an equivalent time replica (millisecond time scale) of the real time reflected pulses (nanosecond time scale) at the input to the gate 88. A first output of the microprocessor 92 is connected to the input of the first oscillator 74 for turning this oscillator on and off. A second output of the microprocessor circuit 92 is connected to the input of the ramp generator 82 and is an output of an internal clock circuit which functions as the second oscillator to generate the forty Hz pulse train. An input/output of the microprocessor 92 is connected to a bus line 94 for communication with other circuits as discussed below.

A second input of the microprocessor 92 is connected to an output of an EEPROM 96 which is utilized to store information utilized by the microprocessor to generate various output signals as discussed below. A third input of the microprocessor 92 is connected to an output of a sensor 98. The sensor 98 represents any one of various sensors which can generate an input sensor signal related to a parameter to be used by the microprocessor 92 as described below. A fourth input of the microprocessor 92 is connected to an output of an ignition voltage circuit 100 which generates an ignition signal representing the magnitude of the power source, typically the ignition voltage in a vehicle. A third output of the microprocessor 92 is connected to an input of a display driver circuit 102 which has an output connected to a display signal line 104 for generating a display signal. The line 104 is connected to an input of a display 106. The display 106 responds to the display signal by displaying information related to the signal, such as an indication of the amount of the liquid 12 in the tank 14. The display 106 can be analog or digital as described below. A fifth input of the microprocessor 92 is connected to an output of an option switches circuit 108 which permits a selection of various modes of operation of the microprocessor 92 as described below.

As stated above, the reserve end 30 is formed of a plastic material. Thus, the incident pulse 68 only travels to the lower end 22 of the tube 20 and cannot generate a sensing signal for a liquid level below the lower end of the tube. The reserve end 30 permits the continued drawing of liquid when the liquid level 24 is below the end 22. Therefore, a display signal corresponding to the lower end 22 can be used by the display 106 to generate a low liquid warning indication. When used in a vehicle, for example, the display 106 warns the driver of a low fuel situation while the reserve end 30 permits the use of a fuel reserve in the lower portion of the tank 14 below the lower end 22 of the tube 20. However, the reserve end 30 could be formed of a metal material, or even be formed integral with the pickup tube 20, by modifying the TDR circuit 40 to generate the low level warning signal at a liquid level corresponding to the lower end 22.

Figures 5, 7:
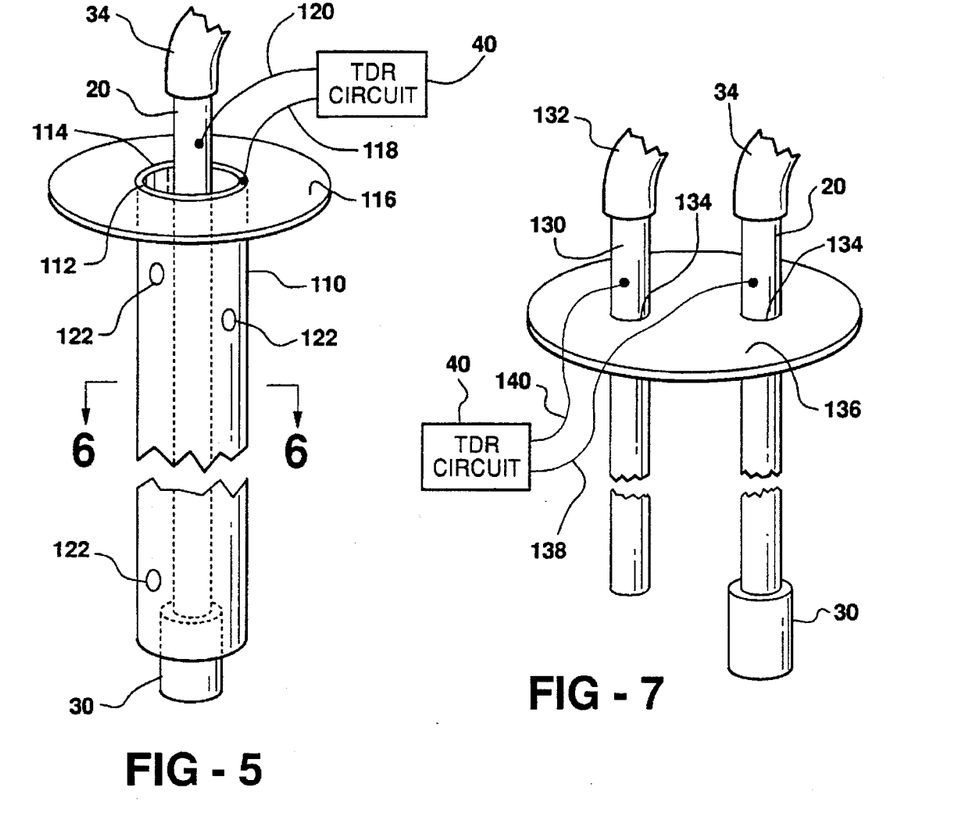
FIG. 5 is a perspective view of an alternate embodiment fluid level sensing apparatus in accordance with the present invention.
FIG. 7 is a perspective view of a second alternate embodiment fluid level sensing apparatus in accordance with the present invention.
Figure 6:
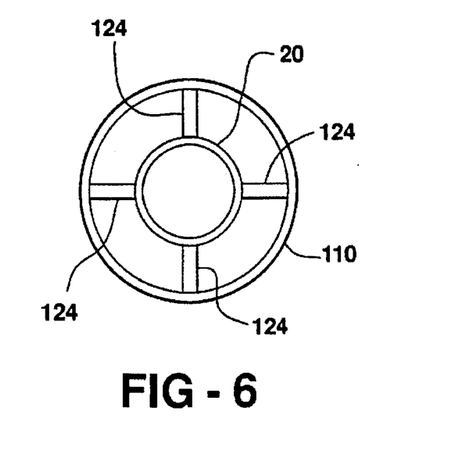
FIG. 6 is an enlarged cross-sectional view as if taken along the line 6—6 in the FIG. 5.

There is shown in the FIG. 5 and the FIG. 6 an alternate embodiment of the fluid level sensing assembly in accordance with the present invention. The pickup tube 20 is connected at the lower end to the reserve end 30 and at the upper end to the pickup line 34. The pickup tube 20 extends through an outer tube 110 having an upper end 112 positioned in an aperture 114 formed in a reflector base plate and mounting plate 116 similar to the plate 48. The upper end 112 is attached to the plate 116 and is electrically connected by a lead 118 to the pulse conductor 80a of the TDR circuit 40. Another lead 120 is connected between the pickup tube 20 and the ground conductor 80b of the TDR circuit 40. A plurality of holes 122 can be formed in the wall of the outer tube 110 to permit gas trapped between the outer tube and the pickup tube 20 to escape and reduce false measurements due to liquid between the tubes splashing or sloshing. As shown in the FIG. 6, the tubes 20 and 110 can be maintained in desired relative positions by a plurality of spacers 124 connected between an outer surface of the pickup tube 20 and an inner surface of the outer tube 110. The tubes 20 and 110 form a coaxial transmission line type of probe.

There is shown in the FIG. 7 a second alternate embodiment of the fluid level sensing assembly in accordance with the present invention. The pickup tube 20 is connected at the lower end to the reserve end 30 and at the upper end to the pickup line 34. A return tube 130, similar to the pickup tube 20 but utilized to return liquid to a tank, has an upper end connected to a return line 132. Each of the tubes 20 and 130 extend through apertures 134 formed in a reflector base plate and mounting plate 136 similar to the plate 48. The pickup tube 20 is electrically connected by a lead 138 with the pulse conductor 80a of the TDR circuit 40. Another lead 140 is connected between the return tube 130 and the ground conductor 80b of the TDR circuit 40. The tubes 20 and 130 form a balanced or parallel pair transmission line type of probe.

Figure 8:
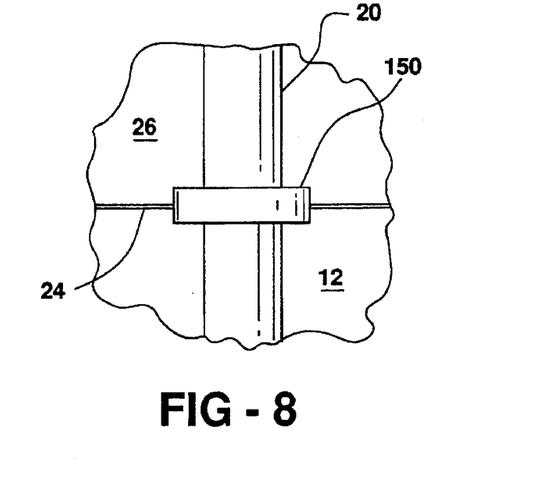
FIG. 8 is a fragmentary view of the pickup tube shown in the FIG. 1 with a float mounted thereon.

In the case where the fluid 12 being measured has a dielectric constant that does not create a significant enough change in the impedance of the tube 20 so that there is little reflection, there is shown in the FIG. 8 an optional float 150 in accordance with the present invention. The float 150 is slidably mounted on the pickup tube 20 and has a density such that it floats at the surface level 24. The float 150 is formed of a material which creates a relatively large dielectric difference thereby generating the reflected signal with at least a predetermined magnitude sufficient to be detected by the TDR circuit 40.

The microprocessor 92 can be any commercially available model suitable for use in hostile environments such as one of the Zilog Z8 microprocessor family. The use of a family of microprocessors having different speeds and program capacities permits variations in the functions performed by the TDR circuit 40 simply by changing the microprocessor/ software combination. Furthermore, the shape of the tank 14 will determine the amount of fluid 12 below the level 24.

Thus, a lookup table of volume versus level 24 can be stored in the memory of the microprocessor 92 or in a separate memory such as the EEPROM memory 96 for each type of tank with which the assembly 10 is to be used.

Figure 9:
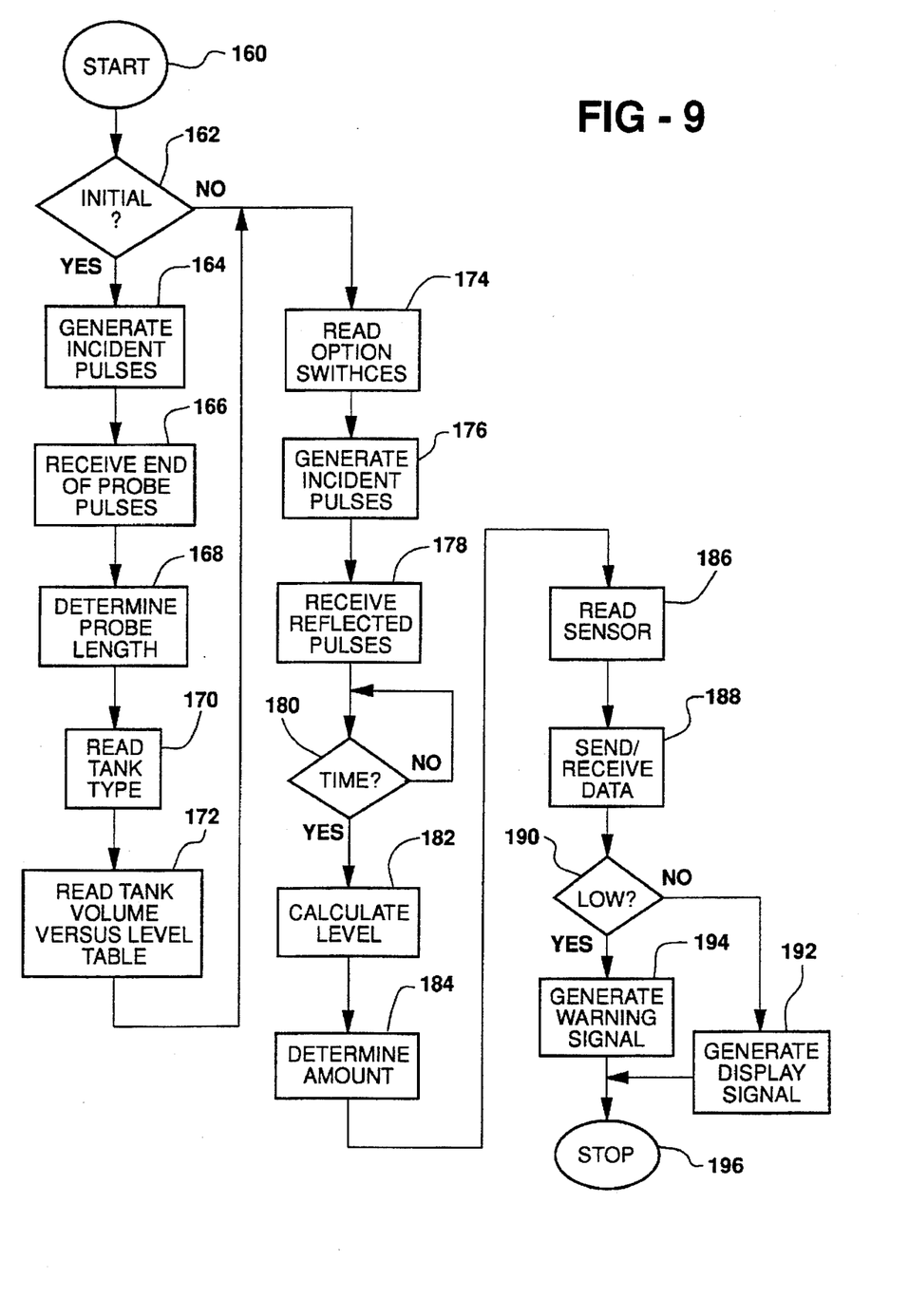
FIG. 9 is a flow diagram of the operation of the microprocessor shown in the FIG. 4 according to the method of the present invention.

As shown in the FIG. 4 and the FIG. 9, the program of operation of the microprocessor begins at a circle START 160, typically when power to the TDR circuit 40 is turned on, and enters a decision point INITIAL? 162 to check whether an initial calibration must be performed. If the calibration is to be performed, the program branches from the decision point 162 at "YES" to an instruction set GENERATE INCIDENT PULSES 164 wherein the microprocessor 92 turns on the first oscillator 74. The program enters an instruction set RECEIVE END OF PROBE PULSES 166 wherein the microprocessor 92 generates the second oscillator pulse train to the ramp generator 82 to turn on and off the sample gate 88 and receive the reflected pulses from the lower end 22 of the pickup tube 20 through the amplifier and filter circuit 90. Next, the program enters an instruction set DETERMINE PROBE LENGTH 168 whereby the microprocessor calculates the length of the probe. An incident pulse 68 is generated at a predetermined point on the pickup tube 20 and the microprocessor 92 senses the reflected pulse 70 or 72 from the surface level 24 and then senses a second reflected pulse from the lower end 22 of the pickup tube 20. The second reflected pulse has a lower magnitude than the first reflected pulse and the elapsed time between generation of the incident pulse and receipt of the second reflected represents the probe length which is the distance between the lower end 22 and the predetermined point. The instruction sets 164, 166 and 168 are utilized where, for example, the pickup tube 20 is provided in one length and is cut to fit a selected tank at the time of installation. As an alternative, the pickup tube length can be preset in the software, or selected by actuating the option switches 108, or stored in the EEPROM memory 96.

The program then enters an instruction set READ TANK TYPE 170 to obtain information on the shape of the tank 14. The tank type can be preset in the software, or selected by actuating the option switches 108, or stored in the EEPROM memory 96. Now the program enters an instruction set READ TANK VOLUME VERSUS LEVEL TABLE 172 to obtain information on the amount of the fluid 12 in the tank 14 based upon the stored relationships between the sensed fluid level and the volume for the identified type of tank. The volume versus level information can be preset in the software, or selected by actuating the option switches 108, or stored in the EEPROM memory 96.

Now the program leaves the initialization portion and enters an instruction set READ OPTION SWITCHES 174 wherein the microprocessor 92 checks the settings of the option switches 108. The instruction set 174 also is entered from a "NO" branch of the decision point 162 when no initialization is required. Next, the program enters an instruction set GENERATE INCIDENT PULSES 176 wherein the microprocessor 92 turns on the first oscillator 74. The program enters an instruction set RECEIVE REFLECTED PULSES 178 wherein the microprocessor 92 generates the second oscillator pulse train to the ramp generator 82 to turn on and off the sample gate 88 and receive the reflected pulses from the surface level 24 of the fluid through the amplifier and filter circuit 90. The program enters a decision point TIME? 180 to check the elapsed time against any predetermined time period over which the fluid level measurements are to be averaged. For example, the fuel in a fuel tank mounted in a moving vehicle will be subject to "sloshing" which can generate significantly different consecutive measurements. By averaging the measurements over a period of, for example, fifteen to sixty seconds, rapid changes in the displayed information can be eliminated to provide a more accurate indication of the amount of fluid in the tank. The time period can be preset in the software, or selected by actuating the option switches 108, stored in the EEPROM memory 96. If the predetermined time period has not elapsed, the program branches at "NO" from the point 180 and re-enters the point thereby looping.

If the predetermined time period has elapsed, the program branches at "YES" from the decision point 180 and enters an instruction set CALCULATE LEVEL 182 wherein the position of the level 24 on the pickup tube 20 is calculated from the timing between the incident pulses and the reflected pulses. The program then enters an instruction set DETERMINE AMOUNT 184 wherein the amount of fluid 12 remaining in the tank 14 is calculated utilizing the value of the level 24 and the information in the lookup table for volume versus level. Now the program enters an instruction set READ SENSOR 186 wherein the microprocessor reads a sensor signal generated by the sensor 98. The sensor 98 represents one or more sensors for collecting information related to the fluid 12 in the tank 14. For example, the sensor 98 can be a temperature sensor positioned in the tank for generating a sensor signal representing the temperature of the fluid in the tank. As another example, the sensor 98 can be a pressure sensor either positioned in the tank for generating a sensor signal representing the pressure in the tank in the case of a sealed tank, or positioned in the pickup tube 20 or in the pickup line 34 for generating a sensor signal representing the pressure of the fluid being drawn from the tank. Yet another example is a flow sensor positioned in the pickup tube 20 or in the pickup line 34 for generating a sensor signal representing the rate at which the fluid is being drawn from the tank, or positioned in the return tube 130 (FIG. 7) for generating a sensor signal representing the rate at which fluid is being returned to the tank. Information on the fluid flow to and from the tank 14 permits calculation of fluid usage.

Now the program enters an instruction set SEND/RECEIVE DATA 188 wherein the microprocessor 92 sends and receives data over the bus 94. The bus 94 can be a serial communications line or network which is connected to another microprocessor or a master control. For example, if the tank 14 is a vehicle fuel tank, the bus 94 can be connected to an electronic control unit (ECU) or networked instrument cluster of the vehicle engine. Thus, the ECU or cluster can receive information as the fuel level 24 and other information received from the sensor(s) 98. For vehicle use, the communications on the bus 94 can be in accordance with known standards such as SAE J-1587, SAE J-1939 or SAE J-1950. The program then enters a decision point LOW? 190 to determine whether the remaining amount of fluid represents a low fluid condition. The low fluid condition can be a level 24 at the lower end 22 of the pickup tube 20 or any other predetermined point on the pickup tube which point can be preset in the software, or selected by actuating the option switches 108, or stored in the EEPROM memory 96. If the fluid level is not low, the program branches from point 190 at "NO" to an instruction set GENERATE DISPLAY SIGNAL 192 to generate the signal to the display driver 102 which generates the display signal on the line 104 to the display 106. If the fluid level is low, the program branches from point 190 at "YES" to an instruction set GENERATE WARNING SIGNAL 194 to generate the signal to the display driver 102 which generates a low fluid warning display signal on the line 104 to the display 106 or to a separate low fluid warning display (not shown). Typically, the program continues to run until power to the TDR circuit 40 is turned off whereupon the program exits at a circle STOP 196.

In summary, the present invention is an apparatus for sensing a level of a fluid 12 in a tank 14 comprising: a pulse means 40 for generating a plurality of incident pulses 68 and for sensing a plurality of reflected pulses 70,72, the pulse means 40 including a first pulse generator means 74,76 having an output connected to an input/output signal means 78 for generating the incident pulses 68, a microprocessor means 92 having a first output connected to an input of the first pulse generator means 74,76 for turning on and off the first pulse generator means 74,75, a gate means 74,82,84, 86,88 having a first input connected to the input/output signal means 78 and a second input connected to a second output of the microprocessor means 92 and an output connected to a first input of the microprocessor means 92, and wherein the microprocessor means 92 generates a pulse train at the second output for gating the gate means 74,82, 84,86,88 to pass the reflected pulses 70,72 to the first input of the microprocessor means 92 and has a third output for generating a sensing signal; and an electrically conductive pickup tube means 20 having a lower end 22 and being connected to the input/output signal means 78 at a point adjacent an upper end 38 spaced a predetermined distance from the lower end 22, the pickup tube means 20 being adapted for insertion into a tank 14 with the lower end 22 in a first fluid 12 for drawing the first fluid 12 from the tank 14 through the pickup tube means 20 whereby when the pickup tube means 20 is inserted into the tank 14 with the lower end 22 in the first fluid 12 and the pulse means 40 generates the incident pulses 68, each incident pulse 68 travels from the point along the pickup tube means 20 to a surface 24 of the first fluid 12 at a boundary of a second fluid 26 above the first fluid 12 to generate an associated one of the reflected pulses 70,72 which travels back along the pickup tube means 20 to the point, and the microprocessor means 92 is responsive to the generation of the incident pulses 68 and receipt of the associated reflected pulses 70,72 for determining an elapsed time between the generation and the receipt for generating the sensing signal at the third output in response to the elapsed time, the sensing signal representing an amount of the first fluid 12 in the tank 14.

The present invention includes a method of sensing a level 24 of a fluid 12 in a tank 14 comprising the steps of: a. generating an incident pulse 68 at a predetermined point on an electrically conducting pickup tube 20 extending into a tank 14 with a lower end 22 of the pickup tube 20 positioned at a lowest fluid level to be sensed, the incident pulse 68 travelling toward the pickup tube lower end 22 and generating a reflected pulse 70,72 at a surface level 24 of the fluid 12, the reflected pulse 70,72 travelling from the surface level 24 to the predetermined point; b. sensing the reflected pulse 70,72 at the predetermined point; c. utilizing a microprocessor means 92 to determine an elapsed time between generation of the incident pulse 68 and receipt of the reflected pulse 70,72 at the predetermined point; and d. utilizing the microprocessor means 92 to determine an amount of the fluid 12 in the tank 14 based upon the elapsed time.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for sensing a level of a fluid (12) in a tank (14) comprising:

a pulse means (40) for generating a plurality of incident pulses (68) and for sensing a plurality of reflected pulses (70,72), said pulse means (40) including a first pulse generator means (74,76) having an output connected to an input/output signal means (78) for generating said incident pulses (68), a microprocessor means (92) having a first output connected to an input of said first pulse generator means (74,76) for turning on and off said first pulse generator means (74,75), a gate means (74,82,84,86,88) having a first input connected to said input/output signal means (78) and a second input connected to a second output of said microprocessor means (92) and an output connected to a first input of said microprocessor means (92), and wherein said microprocessor means (92) generates a pulse train at said second output for gating said gate means (74, 82,84,86,88) to pass said reflected pulses (70,72) to said first input of said microprocessor means (92) and has a third output for generating a sensing signal; and an electrically conductive pickup tube means (20) having a lower end (22) and being connected to said input/output signal means (78) at a point adjacent an upper end (38) spaced a predetermined distance from said lower end (22), said pickup tube means (20) being adapted for insertion into a tank (14) with said lower end (22) in a first fluid (12) for drawing the first fluid (12) from the tank (14) through said pickup tube means (20) whereby when said pickup tube means (20) is inserted into the tank (14) with said lower end (22) in the first fluid (12) and said pulse means (40) generates said incident pulses (68), each said incident pulse (68) travels from said point along said pickup tube means (20) to a surface (24) of the first fluid (12) at a boundary of a second fluid (26) above the first fluid (12) to generate an associated one of said reflected pulses (70,72) which travels back along said pickup tube means (20) to said point, and said microprocessor means (92) is responsive to said generation of said incident pulses (68) and receipt of said associated reflected pulses (70,72) for determining an elapsed time between said generation and said receipt for generating said sensing signal at said third output in response to said elapsed time, said sensing signal representing an amount of the first fluid (12) in the tank (14).

2. The apparatus according to claim 1 wherein said third output of said microprocessor means (92) is connected to an input of a display driver means (102) for generating a display signal at an output of said display driver means (102).

3. The apparatus according to claim 2 including a display means (106) connected to said output of said display driver means (102) and being responsive to said display signal for indicating the amount of the first fluid (12) in the tank (14).

4. The apparatus according to claim 3 wherein the amount indicated by said display means (106) is a low fluid warning.

5. The apparatus according to claim 1 wherein said microprocessor means (92) has another input and including a sensor means (98) connected to said another input for generating a sensor signal representing a parameter of the first fluid (12) to said microprocessor means (92).

6. The apparatus according to claim 5 wherein said sensor means (98) is a temperature sensor for sensing a temperature of the first fluid (12) and said parameter is a temperature value of the first fluid (12).

7. The apparatus according to claim 5 wherein said sensor means (98) is a pressure sensor for sensing a pressure of the first fluid (12) and said parameter is a pressure value of the first fluid (12) in the tank (14).

8. The apparatus according to claim 5 wherein said sensor means (98) is a pressure sensor for sensing a pressure of the first fluid (12) and said parameter is a pressure value of the first fluid (12) in said pickup tube means (20).

9. The apparatus according to claim 5 wherein said sensor means (98) is a flow sensor for sensing a flow rate of the first fluid (12) and said parameter is a flow rate of the first fluid (12) in said pickup tube means (20).

10. The apparatus according to claim 9 including a return tube means (130) adapted for insertion into the tank (14) adjacent said pickup tube means (20) for returning to the tank (14) at least a portion of the first fluid (12) drawn from the tank (14) and wherein sensor means (98) includes another flow sensor for generating another sensor signal representing another parameter of the first fluid (12) to said microprocessor means (92), said another flow sensor sensing a flow rate of the first fluid (12) and said another parameter is a flow rate of the first fluid (12) in said return tube means (130).

11. The apparatus according to claim 10 wherein said microprocessor means (92) is responsive to said sensor signal generated by said flow sensor and said another sensor signal generated by said another flow sensor for generating said display signal representing a rate of usage of the first fluid (12).

12. The apparatus according to claim 5 including a return tube means (130) adapted for insertion into the tank (14) adjacent said pickup tube means (20) for returning to the tank (14) at least a portion of the first fluid (12) drawn from the tank (14) and wherein said sensor means (98) is a flow sensor for sensing a flow rate of the first fluid (12) and said parameter is a flow rate of the first fluid (12) in said return tube means (130).

13. The apparatus according to claim 1 wherein said microprocessor means (92) has an input/output connected to a bus means (94) for generating and receiving information signals on said bus means (94).

14. The apparatus according to claim 13 wherein said microprocessor means (92) has another input and including a sensor means (98) connected to said another input for generating a sensor signal representing a parameter of the first fluid (12) to said microprocessor means (92) and said microprocessor (92) generates said sensing signal and said sensor signal as said information signals on said bus means (94).

15. The apparatus according to claim 1 including tank volume means (96,108) connected to said microprocessor means (92) for generating values of tank volume versus fluid level, said microprocessor means (94) generating said sensing signal in response to said values and said elapsed time.

16. An apparatus for sensing a level of a fluid (12) in a tank (14) having an electrically conductive pickup tube (20) for drawing the fluid (12) from the tank (14) extending through a wall (16) of the tank (14) into the fluid (12) comprising:

a first pulse generator means (74,76) for generating a plurality of incident pulses (68) at an output thereof;

a gate means (74,82,84,86,88) for sensing a plurality of reflected pulses (70,72) at an input thereof;

a microprocessor means (92) having a first output connected to an input of said first pulse generator means (74,76) for turning on and off said first pulse generator means (74,76), a second output connected to another input of said gate means (74,82,84,86,88) generating a pulse train gating said gate means (74,82,84,86,88) to pass said reflected pulses (70,72) to an output connected to a first input of said microprocessor means (92) whereby when said first pulse generator means (74,76) and said gate means are connected to a point spaced a predetermined distance from a lower end (22) of an electrically conductive pickup tube (20) and the lower end (22) of the pickup tube (20) extends through a wall (16) of a tank (14) into a fluid (12) in the tank (14), the pickup tube (20) functions as a transmission line for said incident pulses (68) which travel from the point along the pickup tube (20) to a surface level (24) of the fluid (12) to generate said reflected pulses (70,72), said microprocessor means (92) determining an elapsed time between generation of each of said incident pulses (68) and receipt of an associated one of said reflected pulses (70,72) being proportional to a distance between the point and the surface level (24) of the fluid (12) in the tank (14).

17. The apparatus according to claim 16 wherein said microprocessor means (92) generates a sensing signal representing an amount of the first fluid (12) in the tank (14) in response to said elapsed time.

18. The apparatus according to claim 17 wherein said microprocessor means (92) generates said sensing signal at an output connected to an input of a display driver means (102) for generating a display signal at an output of said display driver means (102) and including a display means (106) connected to said output of said display driver means (102) and being responsive to said display signal for indicating the amount of the first fluid (12) in the tank (14).

19. The apparatus according to claim 17 wherein said microprocessor means (92) has an input/output connected to a bus means (94) for generating and receiving information signals on said bus means (94), said information signals including said sensing signal.

20. The apparatus according to claim 19 wherein said microprocessor means (92) has another input and including a sensor means (98) connected to said another input for generating a sensor signal representing a parameter of the first fluid (12) to said microprocessor means (92), said information signals including said sensor signal.

21. A method of sensing a level (24) of a fluid (12) in a tank (14) comprising the steps of:

a. generating a train of incident pulses (68) at a predetermined point on an electrically conducting pickup tube (20) extending into a tank (14) with a lower end (22) of the pickup tube (20) positioned at a lowest fluid level to be sensed, said incident pulse (68) travelling toward the pickup tube lower end (22) and generating a reflected pulse (70,72) at a surface level (24) of the fluid (12), said reflected pulse (70,72) travelling from the surface level (24) to the predetermined point;

b. sensing for associated ones of said reflected pulses (70, 72) at a sample rate equal to said first predetermined frequency modulated by a second predetermined frequency less than said first predetermined frequency;

c. utilizing a microprocessor means (92) to determine an elapsed time between generation of said incident pulse (68) and receipt of said reflected pulse (70,72) at the predetermined point; and d. utilizing the microprocessor means (92) to determine an amount of the fluid (12) in the tank (14) based upon said elapsed time.

22. The method according to claim 21 including a step of utilizing the microprocessor means (92) to determine a length of the pickup tube (20) between the predetermined point and the pickup tube lower end (22) based upon an elapsed time between generation of said incident pulse (68) and receipt of another reflected pulse at the predetermined point, said another reflected pulse being generated at the lower end (22) of the pickup tube (20).

23. The method according to claim 21 wherein the step a. includes generating a train of said incident pulses (68) at a first predetermined frequency and the step b. includes sensing for associated ones of said reflected pulses (70,72) at a sample rate equal to said first predetermined frequency modulated by a second predetermined frequency less than said first predetermined frequency.

24. The method according to claim 21 wherein the step d. includes determining the level (24) of the fluid (12) in the tank (14) based upon said elapsed time and determining the amount of the fluid (12) in the tank (14) by selecting the amount based upon the level (24) from a table of tank volume versus level values.

25. The method according to claim 21 wherein the step d. includes generating a sensing signal representing the amount of the fluid (12) in the tank (14).

26. The method according to claim 25 wherein the sensing signal represents a low amount of the fluid (12) in the tank (14).

* * * * *